L. M. ELLIOTT.
SAW FILING MACHINE ATTACHMENT.
APPLICATION FILED JAN. 10, 1920.

1,400,427.

Patented Dec. 13, 1921.
2 SHEETS—SHEET 1.

Inventor
L. M. Elliott.

By (signature) Atty

L. M. ELLIOTT.
SAW FILING MACHINE ATTACHMENT.
APPLICATION FILED JAN. 10, 1920.

1,400,427.

Patented Dec. 13, 1921.
2 SHEETS—SHEET 2.

Inventor
L. M. Elliott

By [signature] Atty

UNITED STATES PATENT OFFICE.

LYMAN M. ELLIOTT, OF INDIANAPOLIS, INDIANA.

SAW-FILING-MACHINE ATTACHMENT.

1,400,427.

Specification of Letters Patent.  Patented Dec. 13, 1921.

Application filed January 10, 1920. Serial No. 350,615.

*To all whom it may concern:*

Be it known that I, LYMAN M. ELLIOTT, a citizen of the United States, residing at Indianapolis, in the county of Marion and State of Indiana, have invented certain new and useful Improvements in Saw-Filing-Machine Attachments; and I do hereby declare the following to be a full, clear, and exact description of the invention, such as will enable others skilled in the art to which it appertains to make and use the same.

This invention relates to new and useful improvements in saw filing machine attachments and more particularly to a saw feeding device and has for its primary object the provision of means adapted to coöperate with the main feeding mechanism for moving the saw at predetermined times when said main feeding mechanism fails to move the saw on account of a broken tooth, thereby obviating the necessity of manually moving the saw so that the main feeding mechanism may again take up its operation.

Another object of this invention is the provision of a saw filing machine attachment of the above stated character which will be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

Figure 1:
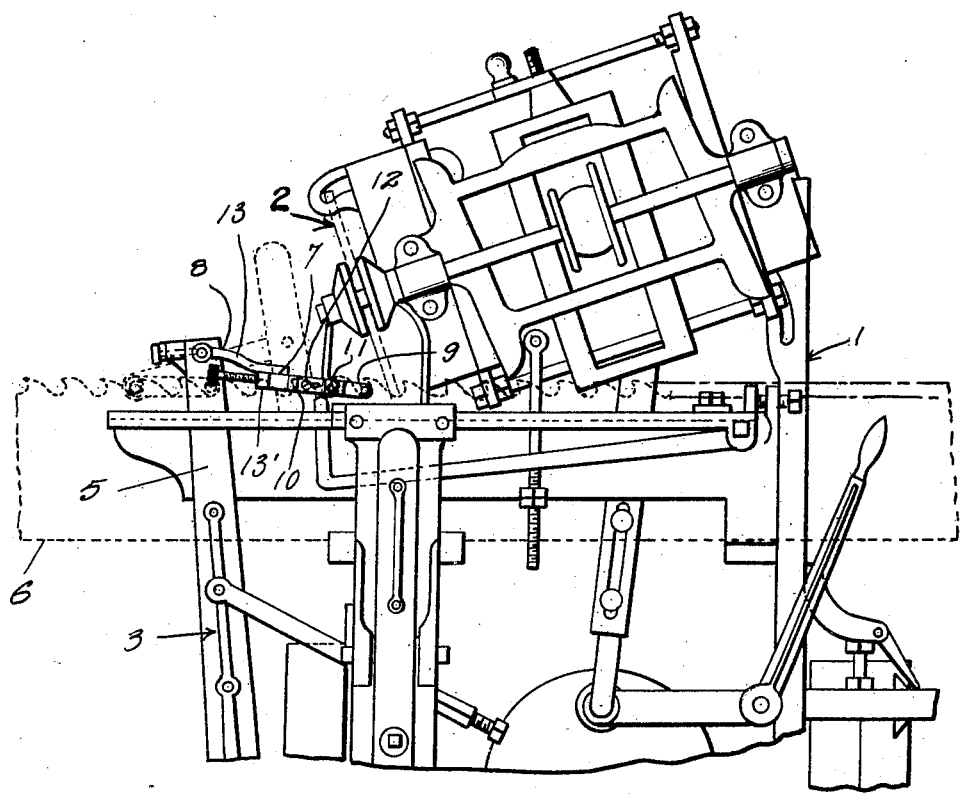
Figure 2:
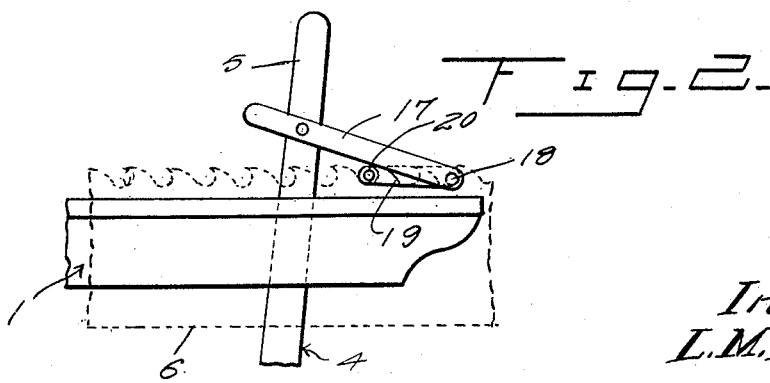
Figure 3:
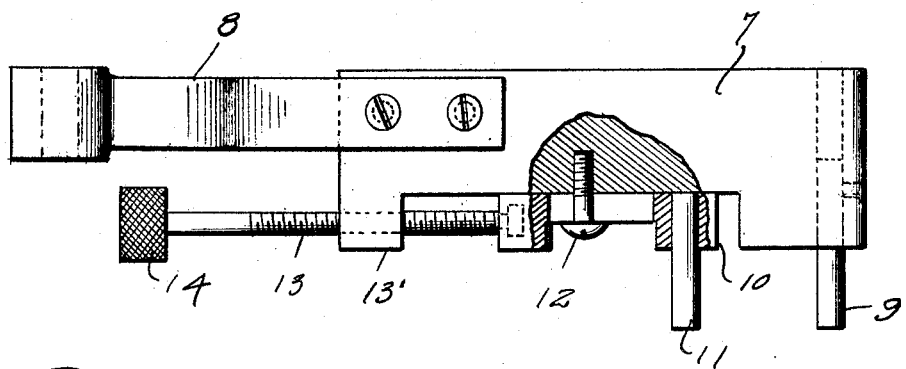
Figure 6:
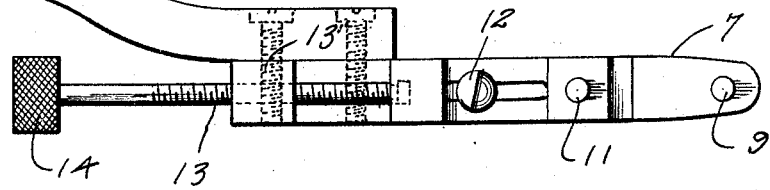
Figure 4:
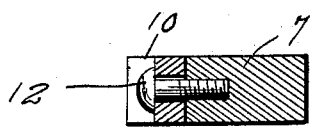
Figure 5:
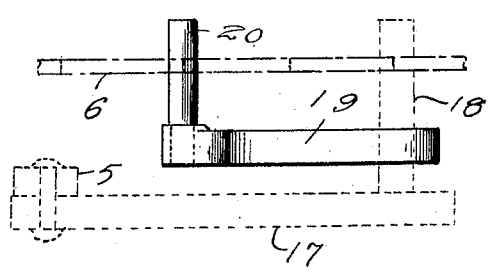

For a complete understanding of my invention, reference is to be had to the following description and accompanying drawings, in which:

Figure 1 is a front elevation of a saw filing machine having an attachment applied thereto and constructed in accordance with my invention, Fig. 2 is a fragmentary rear elevation of the same illustrating the back feed, Fig. 3 is a plan view illustrating my attachment, Fig. 4 is a sectional view of the same, Fig. 5 is a plan view of an arm to be applied to the rear feed.

Referring in detail to the drawings, the numeral 1 indicates as an entirety an ordinary saw filing machine having a sharpening mechanism 2, front and rear feeding mechanisms 3 and 4 that include levers 5 mounted for oscillatory movement. The saw to be sharpened is of the band type as illustrated at 6 and is adapted to be moved about the table of the machine so that the sharpening mechanism can sharpen the teeth as the saw is moved about said table in a step by step motion. The foregoing description relates to a well known type of automatic saw filing machine to which my invention is applied.

An elongated body 7 has formed on one end an arm 8 which is pivotally connected to the upper end of the front lever 5 and has secured to its other end a laterally projecting tooth engaging member 9 for engagement between a pair of teeth of the band saw 6 for moving said saw around the table in a step by step motion during the oscillatory movement of the front lever 5. The front edge of the body 7 is provided with a cut out portion in which is slidably mounted a block 10 carrying a tooth engaging element or member 11 which is disposed rearwardly of the tooth engaging element 9 and may be adjusted toward and from the same so as to accommodate saws that have teeth that vary as to their shape and distances apart. The block 10 is slidably secured to the body 7 by means of a set screw 12 providing a construction wherein the block can be locked to the body 7 when desired. One end of the block 10 has rotatably connected thereto a screw threaded adjusting rod 13 which is threaded in an ear 13' formed in the body 7 and has secured to its free end a finger grip 14 so that said rod can be rotated for the purpose of adjusting the block 10 in relation to the body 7 when the set screw is released.

In operation, the tooth engaging element 9 engages one of the teeth of the saw and on the forward motion of the front lever 5 the saw is moved and in case the saw has broken teeth which permits of the saw engaging element 9 to ride over the same, the saw engaging tooth 11 will engage the next tooth and exert pressure on the same to move the saw forwardly, thereby obviating the necessity of the saw being manually moved to permit the tooth engaging element 9 to again take up its operation.

The rear lever 5 has pivoted thereto an arm 17 carrying a laterally extending tooth engaging element 18 adapted to engage the teeth of the rear run of the saw and has journaled thereon an arm 19 carrying a tooth engaging element 20 which is so located in respect to the tooth engaging element 18 that it will not exert pressure on a tooth of the saw when the tooth engaging element 18 is exerting on a tooth of the saw, but in case of a broken tooth and the tooth engaging element 18 rides over the same, the tooth engaging element 20 will move into engagement with the tooth of the saw and move the rear run of the saw.

While I have shown and described the preferred embodiment of my invention, it will be understood that minor changes in construction, combination and arrangement of parts may be made without departing from the spirit and scope of the invention as claimed.

Having thus described my invention, what I claim is:—

1. In combination, a band saw filing machine having front and rear feeding mechanisms including oscillating levers, bodies connected to said levers, teeth engaging elements on said bodies, and means carried by said bodies and adapted to engage the teeth of the saw and move the latter in case the teeth engaging elements ride over broken teeth.

2. In combination, a band saw filing machine including a feeding mechanism having an oscillating lever, a body, an arm connecting the body to the lever, a pin carried by one end of said body and adapted to engage the teeth of the saw, a block adjustably secured to the body, a tooth engaging element secured to the body and adapted to engage a tooth of the saw in case the pin rides over a broken tooth, and means for adjusting the block endwise of the body to vary the distance between the tooth engaging element and the pin to permit the use of the device on different saws wherein the distances vary between the teeth of the saws.

In testimony whereof I affix my signature in presence of two witnesses.

LYMAN M. ELLIOTT.

Witnesses:
 VERA DAY,
 ED. BILG.